United States Patent [19]

Søyland

[11] 4,102,461
[45] Jul. 25, 1978

[54] EXCAVATOR WITH LOW CENTER OF GRAVITY

[76] Inventor: Ingebret Søyland, Solhogda 2, Brynehaugen, N-4340 Bryne, Norway

[21] Appl. No.: 799,340

[22] Filed: May 23, 1977

Related U.S. Application Data

[63] Continuation-in-part of Ser. No. 597,230, Jul. 18, 1975, abandoned.

[30] Foreign Application Priority Data

Jul. 19, 1974 [NO] Norway .................................. 742642

[51] Int. Cl.² .............................................. E02F 9/20
[52] U.S. Cl. ..................................... 214/132; 212/38; 212/67; 214/134; 37/103
[58] Field of Search .................... 214/132, 134, 138 R, 214/151; 180/64 R, 64 M; 212/38, 66, 67, 69; 37/80 R, 103

[56] References Cited

U.S. PATENT DOCUMENTS

| 1,234,115 | 7/1917 | Armstrong | 214/134 X |
| 1,650,255 | 11/1927 | Bannister | 214/134 |
| 2,893,502 | 7/1959 | Scheuerpflug | 212/145 X |
| 2,949,162 | 8/1960 | Davis | 212/38 X |
| 3,738,442 | 6/1973 | Eiler | 212/38 X |

FOREIGN PATENT DOCUMENTS

933,224 9/1955 Fed. Rep. of Germany ......... 212/38

Primary Examiner—L. J. Paperner
Attorney, Agent, or Firm—John J. Dennemeyer

[57] ABSTRACT

An excavator includes a vessel-like lower frame having a generally vertical side wall, and a bottom wall that forms a support plate. Wheel means are secured to the lower frame side wall, and an upper frame is mounted on the lower frame for rotation about a vertical axis. The upper frame carries a cabin, and a boom and bucket assembly. The engine and other heavy equipment components for operating the excavator are secured to the underside of the upper frame and rotate therewith, thereby giving the excavator a low center of gravity, and eliminating clutter around the operator's cabin.

8 Claims, 6 Drawing Figures

EXCAVATOR WITH LOW CENTER OF GRAVITY

This application is a continuation-in-part of application Ser. No. 597,230, filed on July 18, 1975, now abandoned.

BACKGROUND OF THE INVENTION

1. Field of the Invention

The present invention relates generally to excavators of the type including a base portion, and an upper portion that is rotatably mounted on the base portion and which carries a boom and bucket assembly. More particularly, it relates to an improved excavator of this general type, designed to have an unusually low center of gravity, and to eliminate clutter around the operator's cabin.

2. Description of the Prior Art

Powered machines for use in excavating the earth are known, and several different designs have been proposed therefor. One conventional construction includes a base portion provided with wheels, and upon which is mounted a turntable or platform carrying the boom and bucket assembly, the operator cabin, the internal combustion engine utilized to power the machine, necessary hydraulic components, and other equipment.

Excavators of this general type have found acceptance over the years, in that they are adaptable to the requirements of different excavating needs. However, the conventional excavator of this type also suffers from certain problems inherent from its construction and arrangement.

One of these problems is that the conventional excavator of this general type has a relatively high center of gravity, which renders it somewhat unstable under certain operating conditions. Further, the presence of the engine and other heavy equipment components at the same level as the operator's cabin tends to limit the vision of the operator, and poses other safety problems.

Because of the problems inherent in present excavators of this general type, there is need for a new concept in excavator construction. The present invention is intended to satisfy that need.

SUMMARY OF THE INVENTION

The excavator of the present invention includes a lower frame shaped like a large vessel, and having a bottom wall that forms a support plate, and a generally vertical side wall. The bottom wall or support plate can engage the earth when the excavator is being operated in soft ground, in which case it then acts as a support base for the machine.

Wheel means are attached to the exterior of the side wall of the lower frame, and the frame has a ring gear mounted on the upper end thereof. Rotatably mounted on the lower frame is an upper frame, which carries a cabin, and a boom and bucket assembly. In a first embodiment of the invention the cabin and boom and bucket assembly are mounted directly on the upper frame, and in a second embodiment they are carried by a carriage that is mounted for movement axially of a pair of confronting, C-shaped rails secured to the upper frame.

The internal combustion engine for operating the excavator of the invention is secured to the underside of the upper frame, and extends downwardly into the vessellike lower frame. Similarly, other heavy equipment components of the excavator are also suspended from the upper frame, as is a drive motor having a drive gear which is in engagement with the ring gear mounted on the upper end of the lower frame. The fuel and hydraulic fluid tanks for the excavator can be either suspended from the upper frame, or mounted thereon, but in either instance will rotate with the upper frame and the engine carried thereby.

With this arrangement of components, the excavator of the invention is provided with an unusually low center of gravity, such that the machine will be stable under substantially all operating conditions. The safety of the present invention is further enhanced because the upper side of the upper frame is free of many of the components normally mounted thereon, which reduces clutter around the operator's cabin, improves visibility, and provides space for mounting relatively light weight accessories.

It is the principal object of the present invention to provide an improved excavator, wherein the machine is provided with a low center of gravity and is designed to be stable under substantially all operating conditions.

Another object of the invention is to provide an improved excavator wherein the area around the operator's cabin is free of the usual internal combustion engine and its associated equipment.

A further object is to provide an excavator designed to be normally supported by wheel means, but which includes a vessel-like lower frame that will act as a supporting base should the wheel means sink into the ground.

Other objects and many of the attendant advantages of the invention will become readily apparent from the following Description of the Preferred Embodiments, when taken in conjunction with the accompanying drawings.

DESCRIPTION OF THE PREFERRED EMBODIMENTS

Figure 1:
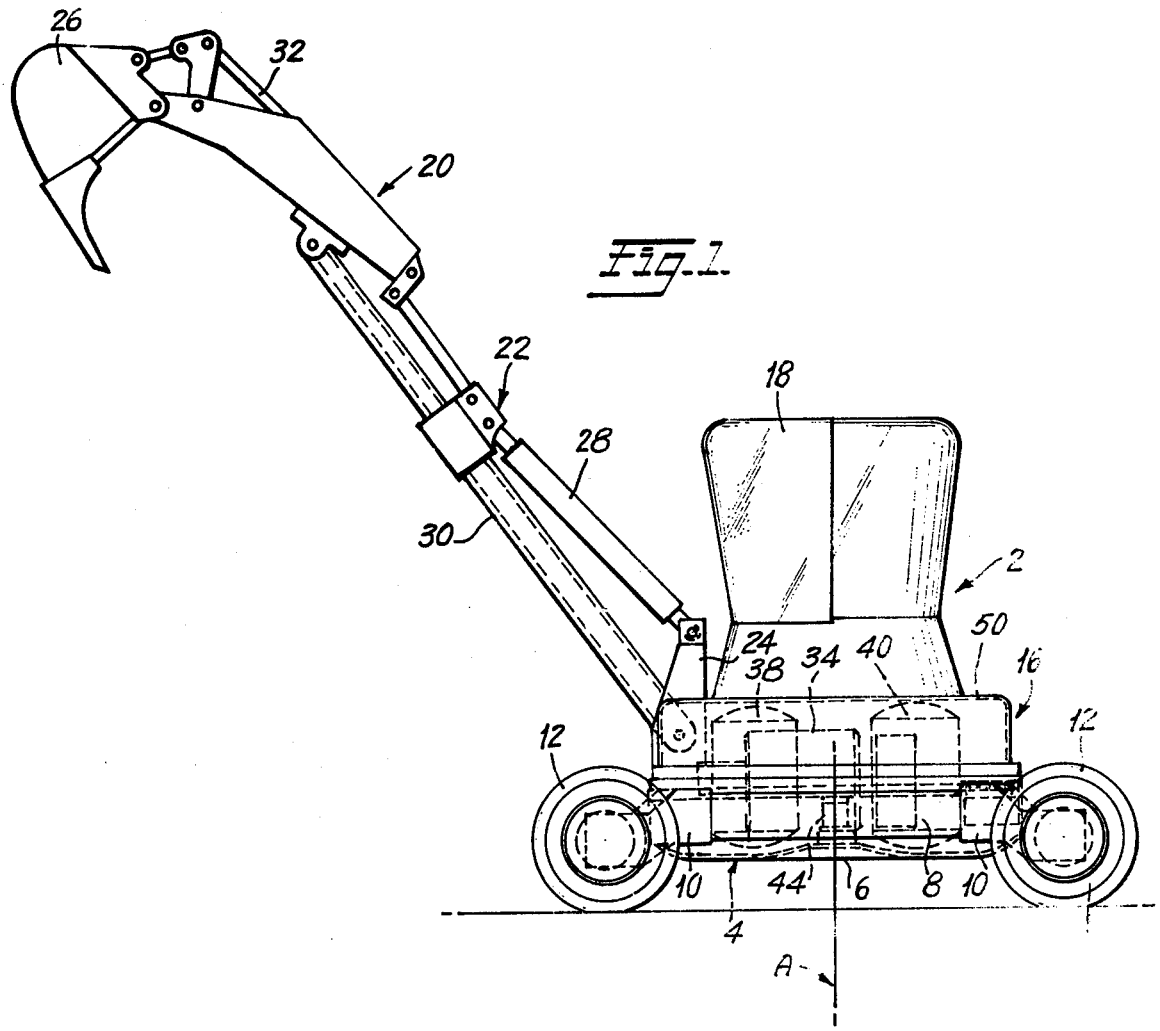
FIG. 1 is a side elevational view of a first embodiment of the excavator of the invention, showing the vessellike lower frame, the rotatably mounted upper frame, and the cabin and the boom and bucket assembly, with the operating engine, the drive motor and other relatively heavy components shown in broken lines, suspended from the upper frame.
Figure 2:
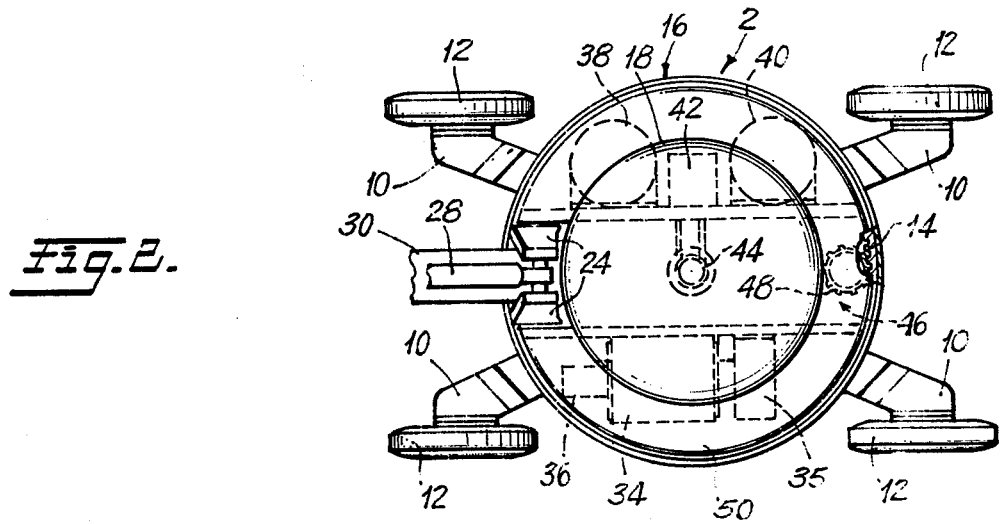
FIG. 2 is a fragmentary, top plan view of the excavator of FIG. 1.
Figure 3:
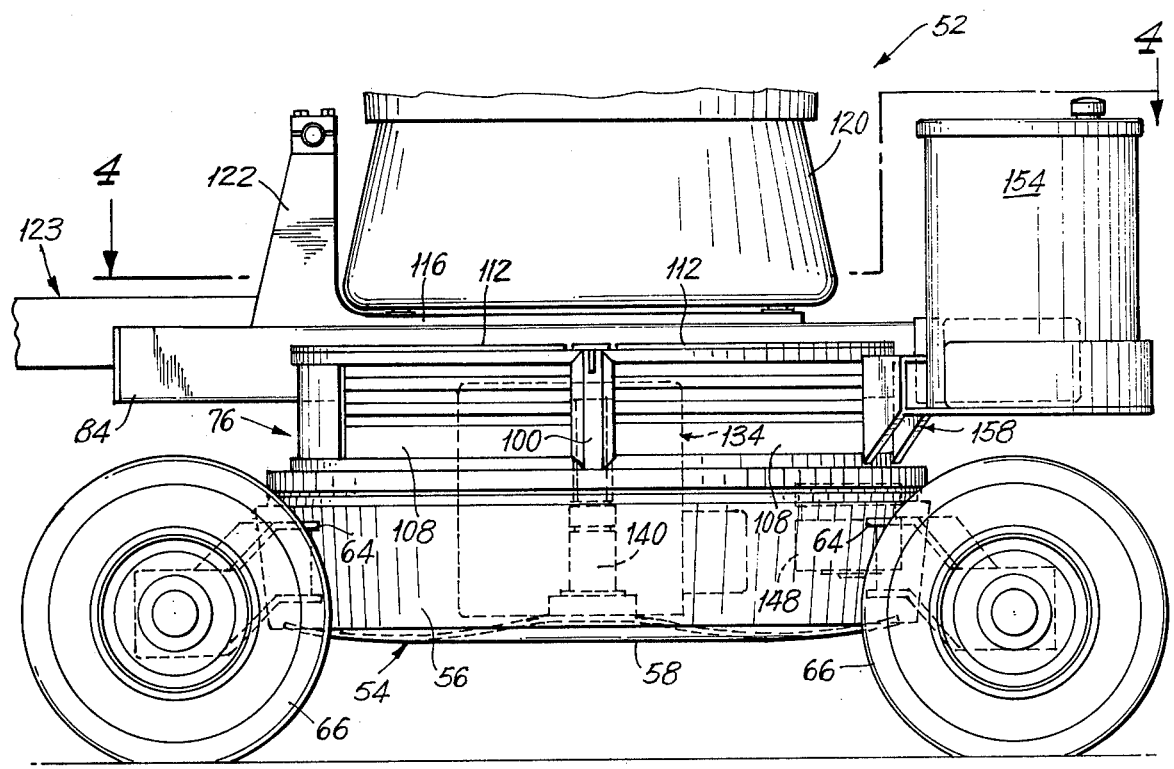
FIG. 3 is an enlarged fragmentary view of the lower portion of a second embodiment of the excavator of the invention, wherein the cabin and the boom and bucket assembly are carried on a carriage mounted for translational movement between a pair of confronting C-shaped rails.
Figure 4:
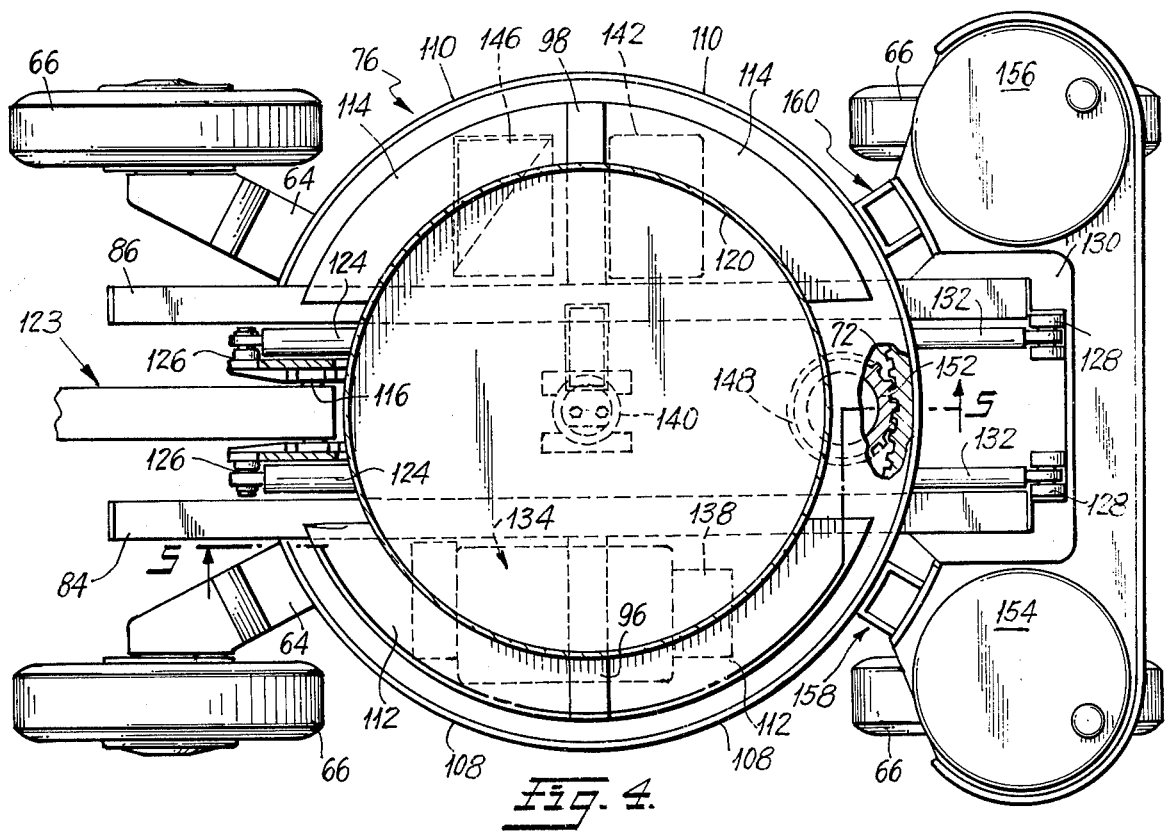
FIG. 4 is a horizontal sectional view taken along the line 4—4 in FIG. 3.
Figure 5:
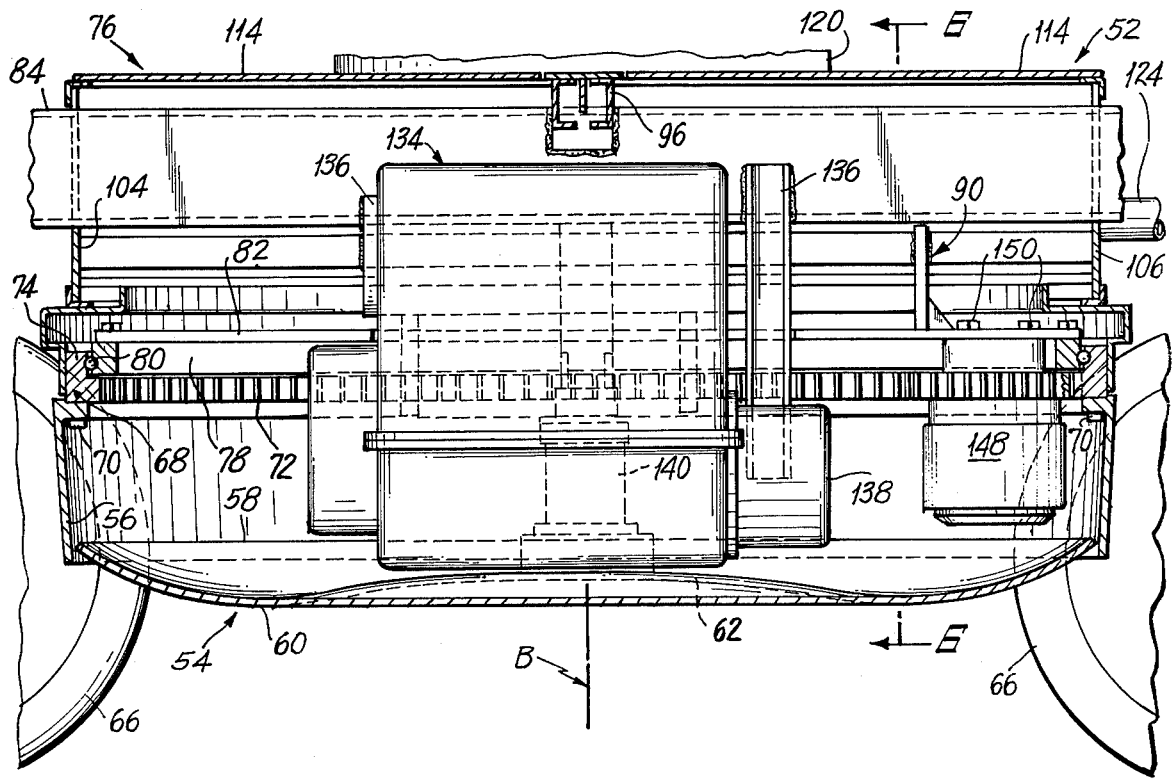
FIG. 5 is a vertical sectional view taken along the line 5—5 in FIG. 4, and showing details of the vessellike lower frame, the ring gear, and the bearing arrangement for mounting the upper frame rotatably on the lower frame.

Referring now to FIGS. 1 and 2, an excavator is indicated generally at 2, and includes a lower frame 4 comprising a generally cylindrical vessel having a bottom wall 6 and a generally vertical side wall 8. The vertical side wall 8 has brackets 10 secured to the exterior thereof at spaced locations around its periphery, each bracket 10 carrying a wheel 12. The bottom wall 6 of the lower frame 4 is designed to act as a support wall for the excavator 2 in soft ground, should the wheels 12 sink into the earth sufficiently to engage the bottom wall 6 with the ground.

The upper end of the lower frame 4 has an internal ring gear 14 mounted thereon, and an upper frame 16 is mounted on said lower frame 4 to rotate about a vertical axis A. Mounted on the upper frame 16 are an operator cabin 18, and a boom and bucket assembly indicated generally at 20.

The boom and bucket assembly 20 is movable in a vertical plane, and includes a boom 22 pivotally anchored at its base to brackets 24 carried by the upper frame 16. The boom 22 has a bucket 26 pivoted on its outer end, and the assembly is operated by hydraulic cylinders 28, 30 and 32, arranged in the usual manner.

The upper frame 16 with its attached cabin 18 and boom and bucket assembly 20 is rotatable about the vertical axis A, and is supplied with power from an internal combustion engine 34 that is suspended from the upper frame 16 to rotate therewith, the engine 34 being received in the vessellike lower frame 4 and having a hydraulic pump 36 connected thereto. A cooling unit 35 is suspended from the upper frame 16, adjacent the engine 34.

On the opposite side from the engine 34 the upper frame 16 has a fuel tank 38 and a hydraulic fluid tank 40 suspended therefrom, and a battery 42 is also suspended from said upper frame. A conventional swivel fluid distribution unit 44 is mounted on the bottom wall 6 of the lower frame 4, and serves to connect fluid lines running between the hydraulic pump 36 and related components of the excavator.

In order to rotate the upper frame 16, a drive motor 46 is suspended therefrom, and includes a drive gear 48 that is engaged with the ring gear 14. Thus, operation of the drive motor 46 is effective to rotate the upper frame 16 and its attached components about the vertical axis A.

With the arrangement shown in FIGS. 1 and 2, wherein the major, heavy components of the excavator including the engine 34, the hydraulic pump 36, and related accessory equipment are suspended from the upper frame 16, the excavator is given a very low center of gravity. This results in an excavator of unusual stability when in operation. Moreover, because the heavy components are all placed below the upper deck 50 of the upper frame 16, this upper deck 50 is relatively free from the usual clutter of equipment found at this location in an excavator. This facilitates better vision for the operator, and assures safer operation of the excavator.

In order to more fully explain the invention, reference is now made to FIGS. 3–6, wherein a second embodiment of the invention is shown, in greater detail than in FIG. 1. There are two substantial differences between the embodiment of FIGS. 3–6 and that of FIGS. 1 and 2, in that the cabin and the boom and bucket assembly of FIGS. 3–6 are mounted on a movable carriage rather than being fixed to the upper frame 16, and the hydraulic fluid and fuel tanks in FIGS. 3–6 are mounted exteriorally for easier access.

Referring now to FIGS. 3–6, an excavator is indicated generally at 52, and includes a vessel-like lower frame 54 having a cylindrical, generally vertical side wall 56 to the lower edge of which a bottom wall 58 is secured. As in FIGS. 1 and 2, the bottom wall 58 is designed to support the excavator in soft earth, when such engages the ground. The bottom wall 58 includes an annular, rounded convex portion 60 and a central, concave portion 62, which increase the structural strength thereof and help adapt it to its support plate function.

Brackets 64 are secured to the generally vertical side wall 56 of the lower frame 52 at spaced intervals therearound, and each carries a wheel 66. The wheels 66 are the normal support for the excavator, and when on firm ground serve to space the bottom wall 58 of the lower frame 52 from the earth.

The upper edge of the side wall 56 has an annular member 68 secured thereto by bolts 70, or other suitable securing means, and said member includes an annular ring gear 72, and an annular outer bearing race 74 disposed above the ring gear. An upper frame is generally indicated at 76, and has an annular inner bearing race 78 on its lower end. The inner and outer bearing races 78 and 74 receive ball bearings 80 therebetween, which serve both to connect the upper frame 76 to the lower frame 52, and to mount the upper frame 76 for rotation about a vertical axis B passing centrally through the upper and lower frames.

Figure 6:
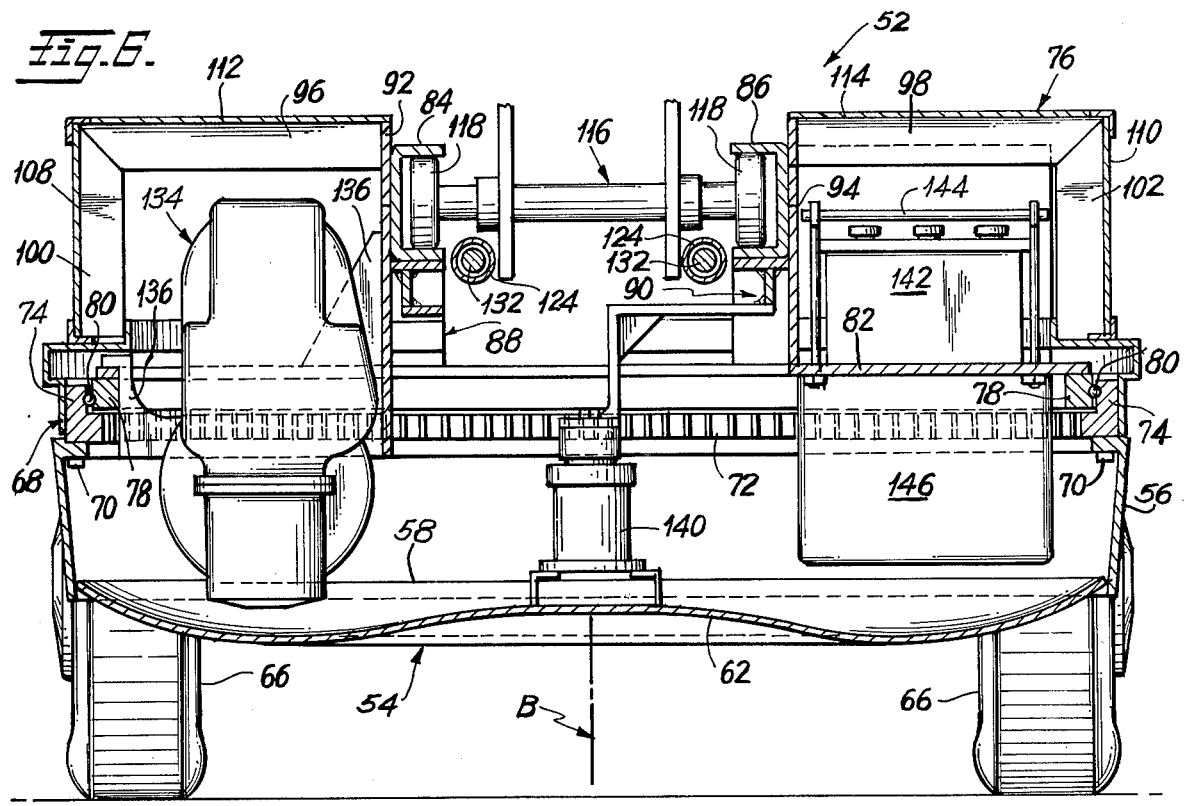
FIG. 6 is a vertical sectional view taken along the line 6—6 in FIG. 5, showing details of the carriage mounting arrangement, and the design of the upper frame.

The upper frame 76 is fabricated from structural elements, and includes a base plate 82 that is secured to the inner bearing race 78. Centrally of the base plate 82 two confronting, parallel, horizontally extending C-shaped rails 84 and 86 are supported on brackets 88 and 90, respectively, which include vertical plates 92 and 94. Lateral support members 96 and 98 project horizontally from the rails 84 and 86 along a diameter of the upper frame 76, the outer ends of the members 96 and 98 being supported by vertical members 100 and 102, respectively. Arcuate, vertical fore and aft plates 104 and 106 are secured to the upper frame 76, the plates being cut out centrally thereof so that the rails 84 and 86 can project therebeyond. The result, as best shown in FIG. 6, is that the upper frame 76 has a rectangular opening or channel extending therethrough along its diameter, which is disposed at a right angle to the lateral support members 96 and 98. Removable, arcuate shrouds 108 and 110 are mounted on the upper frame 14, and decking elements 112 and 114 are provided thereon for the convenience of the operator of the excavator.

A carriage 116 is mounted for longitudinal movement along the parallel, confronting C-shaped rails 84 and 86, the carriage 116 having a pair of wheels 118 on each side thereof. The wheels 118 are received within and are confined by the C-shaped rails 84 and 86, so that the carriage is restricted from both vertical and sidways movements, and instead can only move forwardly and backwardly along the longitudinal axis of the parallel rails. The carriage 116 has a cabin 120 mounted thereon, and includes brackets 122 on the forward end thereof for mounting a boom and bucket assembly 123 like that of FIGS. 1 and 2.

In order to move the carriage 116 along the confronting rails 84 and 86, two hydraulic cylinders 124 are provided. One end of each cylinder 124 is secured to a bracket 126 mounted on the forward end of the carriage 116, and the other end thereof is secured to a bracket 128 mounted on an extension 130 of the upper frame 76. Thus, when the piston rods 132 of the hydraulic cylinders 124 are extended against the fixed brackets 128, the carriage 116 will be moved forwardly along the axis of the confronting rails 84 and 86, and vice versa. The boom and bucket assembly 123 of the excavator of FIGS. 3-6 is thus movable forwardly and backwardly of the lower base 54, and is also rotatable about the vertical axis B.

The excavator of FIGS. 3-6 is powered by an internal combustion engine 134, which is suspended from one side of the upper frame 76 by brackets 136. The bulk of the engine 134, as shown in FIGS. 3-6, is disposed below the base plate 82, which is cut out to accommodate the engine and its suspension brackets 136, the upper portion of the engine being enclosed by the shrouds 108 and the decking 112. A hydraulic pump 138 is mounted on the engine 134, and supplies hydraulic fluid to the various components of the excavator through a conventional swivel fluid distribution unit 140 mounted on the bottom wall 58 of the lower frame 54.

Opposite the engine 134, the upper frame 76 supports a battery 142, such being secured to the base plate 82 by a bracket 144. Near the battery 142 a cooling system 146 for the engine 134 is suspended from the upper frame 76, and centrally of the rear portion thereof the base plate 82 has a drive motor 148 secured thereto by bolts 150. The drive motor 148 also extends downwardly from the upper frame 76, and includes a drive gear 152 that is in engagement with the annular ring gear 72.

From a review of FIGS. 3-6, it is evident that all of the major, heavy components of the excavator, including the engine, the hydraulic pump, the drive motor for rotating the upper frame, and the cooling system and other related components, depend downwardly from the upper frame. The result is that the center of gravity of the excavator is very near the ground, resulting in an extremely stable machine. All of these heavy components are placed beneath the operator's cabin 120, with the result that the center of gravity is below the operator in the region of the bearings 80. In addition to the benefits of the lowered center of gravity, this arrangement also leaves the decking 112 and 114 free of clutter, which improves the safety of operation of the excavator.

If desired, the fuel tank and the tank for the hydraulic fluid can also be suspended from the upper frame in FIGS. 3-6, as was done in FIGS. 1 and 2. However, a different arrangement is shown in the drawings, wherein the fuel tank 154 and the hydraulic fluid tank 156 are mounted on brackets 158 and 160, respectively, which extend from the generally cylindrical upper frame 76. This arrangement makes it easier to reach the two tanks, and in some installations is more desirable.

Obviously, many modifications and variations of the invention are possible.

I claim:

1. An excavator, comprising:
    a lower frame, said lower frame having the configuration of a large vessel and including a bottom support plate and a generally vertical side wall, said bottom support plate being engageable with soft ground to prevent said excavator from sinking too deeply thereinto;
    wheel means mounted fore and aft on the exterior of said lower frame means;
    an upper frame rotatably mounted on said lower frame, and operable by drive motor means secured to the underside of said upper frame and received within said vessel-like lower frame;
    a boom and bucket assembly mounted on the upper surface of said upper frame member, and rotatable therewith;
    cabin means mounted on the upper surface of said upper frame member, and rotatable therewith;
    an internal combustion engine, a hydraulic pump, and associated heavy equipment components; and
    means for suspending said engine, said hydraulic pump and said associated heavy equipment components from said upper frame, whereby said items are rotatable with said upper frame and are substantially received within said vessel-like lower frame.

2. An excavator, comprising:
    a lower frame, said lower frame having the configuration of a large vessel and including a bottom support plate and a generally vertical side wall, said bottom support plate being engageable with soft ground to prevent said excavator from sinking too deeply thereinto;
    wheel means mounted fore and aft on the exterior of said lower frame;
    an upper frame;
    means for rotatably connecting said upper frame to said lower frame, for rotation about a vertical axis;
    means connected between said upper frame and said lower frame, operable to effect relative rotation therebetween;
    a boom and bucket assembly;
    cabin means;
    means for mounting said boom and bucket assembly and said cabin means on said upper frame, for rotation therewith;
    an internal combustion engine, a hydraulic pump, and associated heavy equipment components; and
    means for suspending said engine, said hydraulic pump and said associated heavy equipment components from said upper frame, whereby said items are rotatable with said upper frame and are substantially received within said vessel-like lower frame.

3. An excavator as recited in claim 2, wherein said means operable to effect relative rotation between said upper frame and said lower frame includes:
    an annular ring gear mounted on the upper end of said vessel-like lower frame; and
    a drive motor secured to the underside of said upper frame to extend downwardly into said vessel-like lower frame, and including a drive gear engaged with said annular ring gear.

4. An excavator as recited in claim 2, wherein said means for rotatably connecting said upper frame to said lower frame includes:
    an outer, annular bearing race mounted on one of said upper frame and said lower frame;
    an inner, annular bearing race mounted on the other of said upper and lower frames, and receivable within said outer bearing race; and
    bearing means engaged between said inner bearing race and said outer bearing race, and arranged to secure said upper frame to said lower frame against axial separation, while permitting relative rotation therebetween.

5. An excavator as recited in claim 2, wherein said means for mounting said boom and bucket assembly and said cabin means on said upper frame includes:
    a pair of confronting, parallel, horizontally extending C-shaped rails mounted on said upper frame;

a carriage, said carriage having a pair of wheels on each side thereof, said wheels being received within said C-shaped rails; and hydraulic cylinder means connected between said carriage and said upper frame, operable to move said carriage along the axis of said C-shaped rails, said boom and bucket assembly and said cabin means being carried by said carriage.

6. An excavator, comprising:

a lower frame, said lower frame having the configuration of a large cylindrical vessel and including a bottom support plate and a cylindrical, generally vertical side wall, said bottom support plate being engageable with soft ground to prevent said excavator from sinking too deeply thereinto;

wheel means mounted fore and aft on the exterior of said lower frame means;

an upper frame;

an outer, annular bearing race mounted on one of said upper frame and said lower frame;

an inner, annular bearing race mounted on the other of said upper and lower frames, and receivable within said outer, annular bearing race;

bearing means engaged between said inner and said outer bearing races, for connecting said upper frame to said lower frame against axial separation, while providing for relative rotation therebetween about a vertical axis;

an annular ring gear carried by one of said upper frame and said lower frame;

drive motor means carried by the other of said upper and lower frames, and engaged with said annular ring gear, said drive motor means being operable to effect rotation of said upper frame relative to said lower frame;

a boom and bucket assembly;

cabin means;

means for mounting said boom and bucket assembly and said cabin means on said upper frame, for rotation therewith;

an internal combustion engine, a hydraulic pump, and associated heavy equipment components; and means for suspending said engine, said hydraulic pump and said associated heavy equipment components from said upper frame, whereby said items are rotatable with said upper frame and are substantially received within said vessel-like lower frame, and the center of gravity of said excavator is established beneath said cabin means.

7. An excavator as recited in claim 6, wherein said annular ring gear is carried by said lower frame and is disposed beneath said upper frame, and wherein said drive motor means is suspended from said upper frame, and includes a drive gear engaged with said ring gear.

8. An excavator as recited in claim 7, wherein said means for mounting said boom and bucket assembly and said cabin means on said upper frame includes:

a pair of confronting, parallel, horizontally extending C-shaped rails mounted on said upper frame;

a carriage, said carriage having a pair of wheels on each side thereof, said wheels being received within said C-shaped rails; and hydraulic cylinder means connected between said carriage and said upper frame, operable to move said carriage along the axis of said C-shaped rails.

* * * * *